No. 701,279. Patented June 3, 1902.
L. F. & R. C. ALTPETER.
VEHICLE WHEEL AND TIRE THEREFOR.
(Application filed Nov. 12, 1901.)
(No Model.)
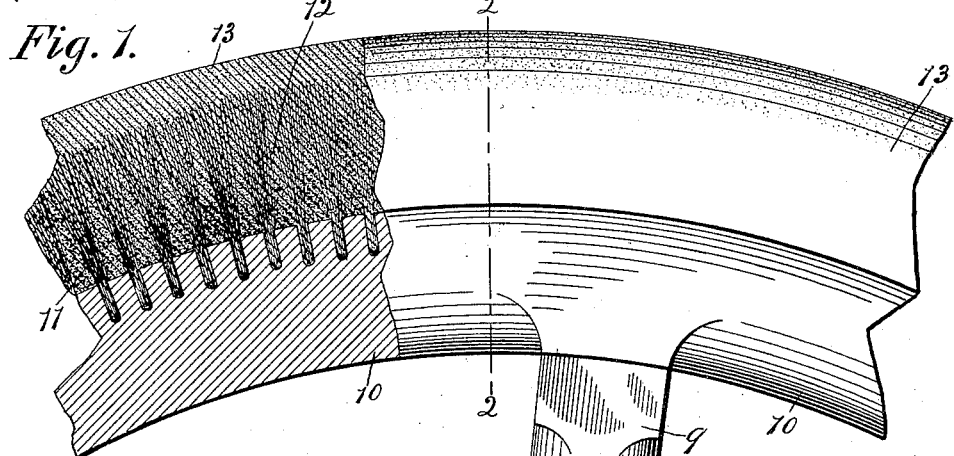
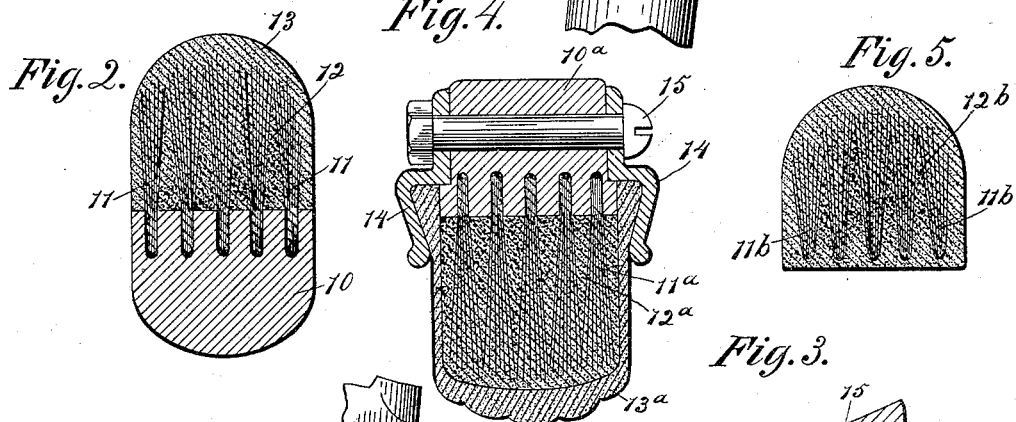
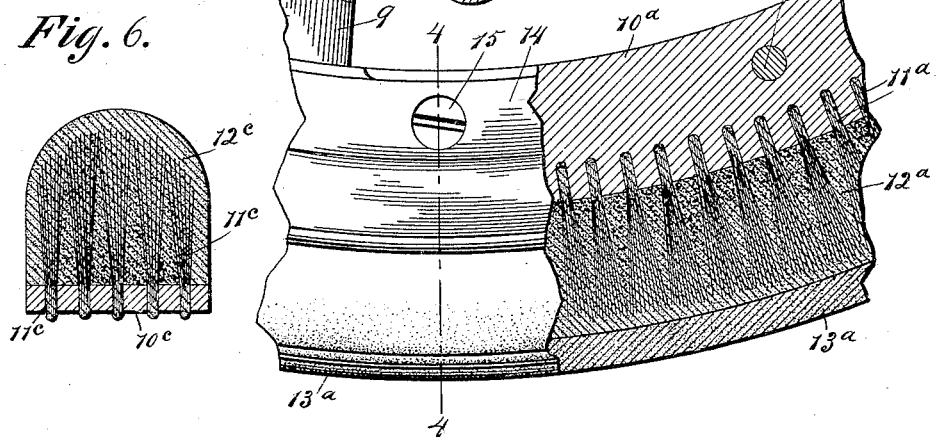
Witnesses:
W. H. Cotton
Inventors:
Louis F. Altpeter.
Robert C. Altpeter.

UNITED STATES PATENT OFFICE.

LOUIS F. ALTPETER AND ROBERT C. ALTPETER, OF CHICAGO, ILLINOIS.

VEHICLE-WHEEL AND TIRE THEREFOR.

SPECIFICATION forming part of Letters Patent No. 701,279, dated June 3, 1902.

Application filed November 12, 1901. Serial No. 82,061. (No model.)

*To all whom it may concern:*

Be it known that we, LOUIS F. ALTPETER and ROBERT C. ALTPETER, citizens of the United States, and residents of Chicago, county of Cook, and State of Illinois, have invented certain new and useful Improvements in Vehicle-Wheels and Tires Therefor, of which the following is a specification and which are illustrated in the accompanying drawings, forming a part thereof.

This invention relates to improvements in rubber tires for bicycles, automobiles, and other vehicles, and has for its object to provide an article of this class which will possess the requisite resiliency to relieve the load supported thereby of the vibration and shocks due to rough roads, and yet at the same time be durable and sufficiently firm or stiff to avoid undue tendency to flatten out under the weight placed thereon.

The invention comprises a backing of wood or metal, which may constitute the rim or felly of the wheel to which the tire is applied, and having placed on the periphery thereof in any suitable manner upstanding stiff bristles and a filling of soft rubber covering the "brush" provided by the bristles and thoroughly intermingled therewith. The exposed surface of the rubber filling may be vulcanized, if desired, in order to protect the core or interior thereof against wear, or an outer and separate casing may be provided, as with the ordinary inner-tube pneumatic tire.

The invention consists of the details and parts, as will be hereinafter fully described, particularly designated in the claims, and which are illustrated in the accompanying drawings, in which—

Figure 1 is a side elevation, partly in section, of a portion of a wheel rim and tire made in accordance with our invention. Fig. 2 is a section on the line 2 2 of Fig. 1. Fig. 3 is a view similar to that shown in Fig. 1 of a modification. Fig. 4 is a section on the line 4 4 of Fig. 3. Fig. 5 is a section of the tire, the rim being dispensed with; and Fig. 6 is a transverse section of a further modification of the tire.

In Figs. 1 and 2, 10 designates the tire-backing, which preferably constitutes the wheel felly or rim, it being made of wood or metal, as desired, and provided with apertures or recesses for the reception of the wheel-spokes 9. Projecting from the periphery of the rim 10 and preferably covering the entire face thereof are stiff bristles of any suitable kind which may be supported in any approved manner, as by boring into the rim and inserting the bristles in tufts 11, as shown, the said tufts extending radially as to the axis of the wheel, of which 10 is the rim, so that in use the direct pressure of the load will be longitudinally of the bristles or tufts. Enveloping the brush provided by the tufts 11 is a covering 12 of soft rubber of the width of the rim 10 and resting thereon as a base and which fills the interstices of the tufts and provides the resilient tread of the tire. This filling 12 is designed to be thoroughly intermingled with the bristles, and in practice any suitable method of securing this result may be utilized, as by placing the rim 10 with the tufts 11 set therein in a suitable mold and then pouring into the same dissolved rubber, the outer face of the rubber filling extending beyond the ends of the bristles, as at 13.

To protect the tire against wear, the outer face of the rubber filling or covering may be vulcanized, as will be readily understood, or instead an outer casing of vulcanized rubber may be employed, as shown in Figs. 3 and 4. In these figures, $10^a$ represents the backing or rim of the wheel, $11^a$ the tufts of bristles, and $12^a$ the rubber filling or covering, which correspond to and are substantially the same as the parts 10, 11, and 12 of Figs. 1 and 2. In this modified form the outer face of the rubber filling $12^a$ need not be vulcanized, but is protected by an outer casing $13^a$, of vulcanized rubber or other suitable material or composition, which is held in place by clamps or annuli 14, fastened to the rim $10^a$ by bolts 15 or by other suitable means.

It is to be understood that the rim 10 or $10^a$ is not essential and that the tire may be made independently thereof, as shown in Fig. 5, the rubber body $12^b$ having embedded therein by the employment of a suitable mold the upstanding bristles $11^b$, and the tire as thus made may be secured by any suitable means to a wheel rim or felly of ordinary construction, or, as shown in Fig. 6, the bristles 11ᶜ may be supported by a thin backing or rim 10ᶜ, designed to be secured to the rim or felly of a wheel and serving as a backing for the rubber body 12ᶜ of the tire.

In the construction shown in Figs. 3 and 4 the casing may be partially filled with soft rubber similar to that filling the interstices of the bristles 11ᵃ and then applied to the brush, so that the soft rubber in the casing will fill in between the outer ends of the bristles and compress the rubber therebetween.

We claim as our invention—

1. In a tire for vehicle-wheels, in combination, a rim having cavities in the periphery thereof, tufts of bristles seated in the cavities and disposed radially as to the wheel, and a covering of rubber filling the interstices of and covering the tufts and forming the body of the tire.

2. In a tire for vehicle-wheels, in combination, a rim having cavities in the periphery thereof, tufts of bristles seated in the cavities and disposed radially as to the wheel, a covering of rubber filling the interstices of and covering the tufts and forming the body of the tire, a jacket covering the rubber body, and a pair of annular clamps and fastening means therefor for securing the jacket to the wheel-rim.

LOUIS F. ALTPETER.
ROBERT C. ALTPETER.

Witnesses:
ARTHUR B. SEIBOLD,
LOUIS K. GILLSON.